Aug. 21, 1962 R. A. HANSON 3,049,783
CONSOLIDATOR FOR MONOLITH CONCRETE PIPE LAYING MACHINES
Filed Oct. 30, 1959 10 Sheets-Sheet 3

Fig. 3

INVENTOR.
Raymond A. Hanson
BY
Atty.

Fig. 4

INVENTOR.
Raymond A. Hanson

Fig. 5

Aug. 21, 1962 R. A. HANSON 3,049,783
CONSOLIDATOR FOR MONOLITH CONCRETE PIPE LAYING MACHINES
Filed Oct. 30, 1959 10 Sheets-Sheet 6

INVENTOR.
Raymond A. Hanson
BY
Atty.

INVENTOR.
Raymond A. Hanson

Aug. 21, 1962 R. A. HANSON 3,049,783
CONSOLIDATOR FOR MONOLITH CONCRETE PIPE LAYING MACHINES
Filed Oct. 30, 1959 10 Sheets-Sheet 8

INVENTOR.
Raymond A. Hanson
BY
atty.

Fig. 16

# United States Patent Office 3,049,783
Patented Aug. 21, 1962

3,049,783
CONSOLIDATOR FOR MONOLITH CONCRETE PIPE LAYING MACHINES
Raymond A. Hanson, Palouse, Wash., assignor to The First National Bank, Pullman, Wash.
Filed Oct. 30, 1959, Ser. No. 849,877
8 Claims. (Cl. 25—32)

This invention relates to machines to lay concrete pipe in place within a trench which forms the bottom and lower outer forms for the pipe. In such machines there is considerable objection to the finished product because of lack of uniformity of the concrete. The machines embody an inner form that is stationary beneath at least the upper part of the laid concrete long enough for the concrete to cure so that it won't sag. Some machines use a completely annular inner stationary form while others use a less than annular form, leaving the lowermost part of the pipe interior with no inner lining past the laying machine bottom former. In either event the difficulty of obtaining good uniform consolidation of the concrete while it is in the moving part of the machine has not been, to my knowledge, overcome prior to my invention.

It is the purpose of my invention to provide a means for consolidating the concrete while it is being laid in the moving part of the machine which means operates to work the concrete, while it is still in position to receive additional concrete so that it is uniformly consolidated all the way around the inner shaping forms, whether they be moving or stationary.

More specifically it is the purpose of my invention to provide a consolidating means operating completely around the inner form of the pipe laying machine to work the entering concrete as the outer form and hopper moves along the trench and thus keep the concrete mass uniformly in motion while the moving parts of the machine pass.

It is a further object of this invention to provide a novel combination of concrete mixing devices with the hopper and shell of the pipe laying machine whereby the mixing devices have both longitudinal and annular motion with respect to the inner lining of the pipe as the pipe is being laid independently of any vibration that may be applied to the shell itself.

The nature and advantages of my invention will be more clearly understood from the following detailed description and the accompanying drawings illustrating a preferred form of the invention and modifications of the consolidating means. The drawings and description are illustrative only, however, and are not intended to limit the scope of the invention as defined in the claims.

This invention is adapted for use on machines which are designed to lay continuous concrete pipelines in the field, using a full circle inner form and no outer stationary forms. The prepared ditch serves as a lower outside form and the upper edge of the pipe is shaped by the moving machine. The general scheme may be seen in FIGURES 1 to 5 which show a first embodiment of the invention.

Figure 1:
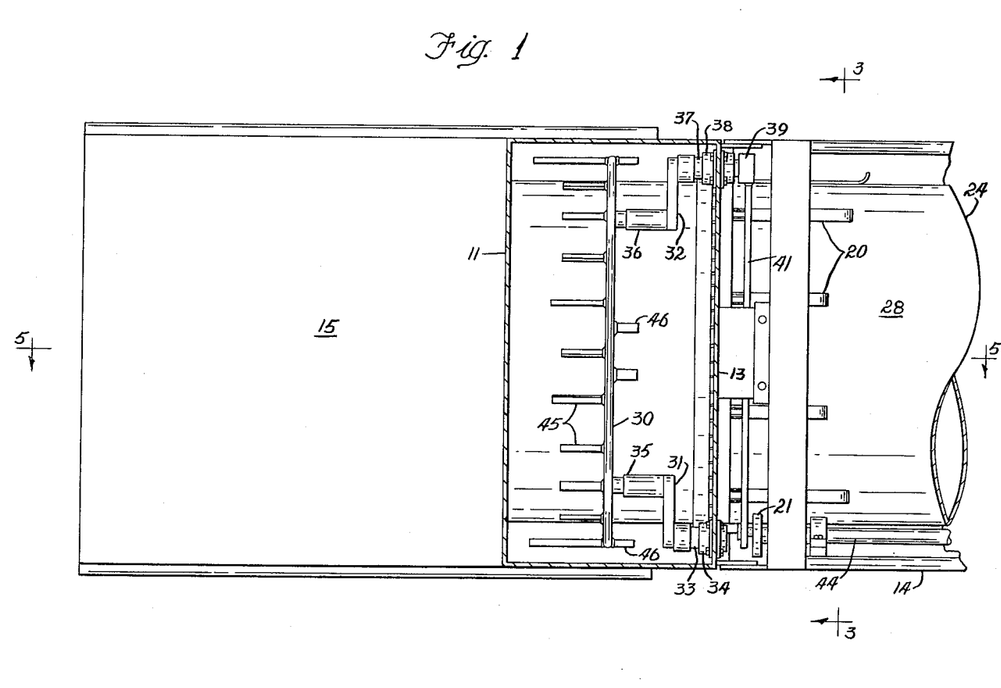
FIGURE 1 is a fragmentary plan view of a concrete pipe laying machine embodying the invention with the hopper shown in section.
Figure 2:
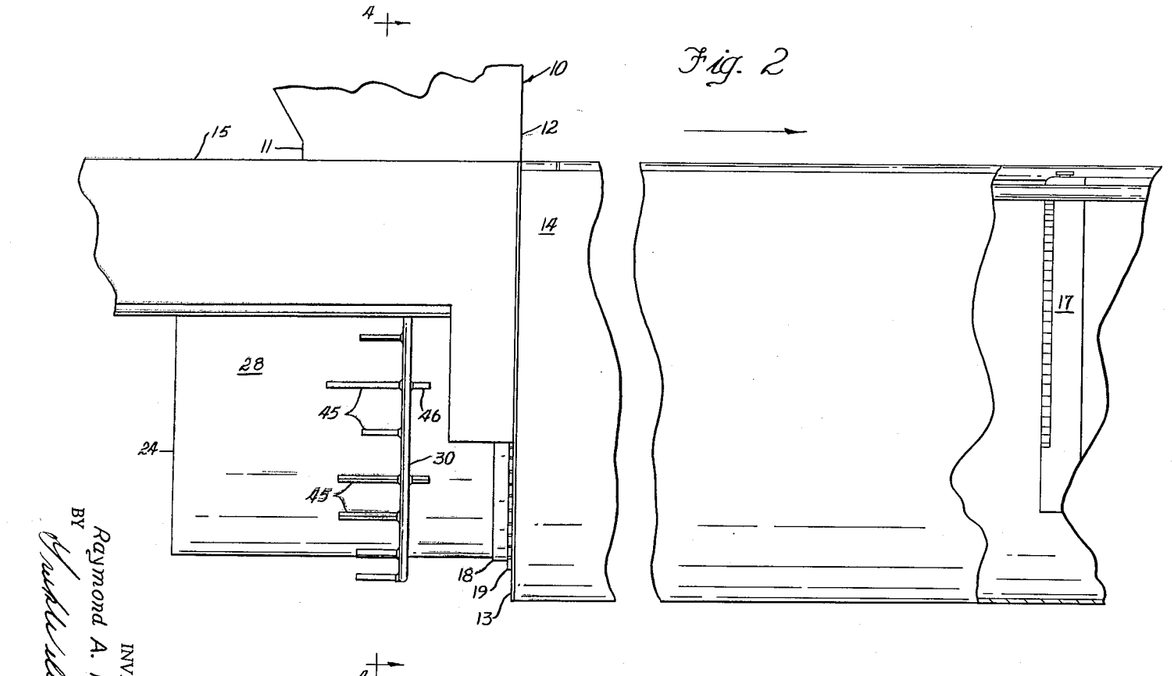
FIGURE 2 is a fragmentary side view of the machine.
Figure 3:
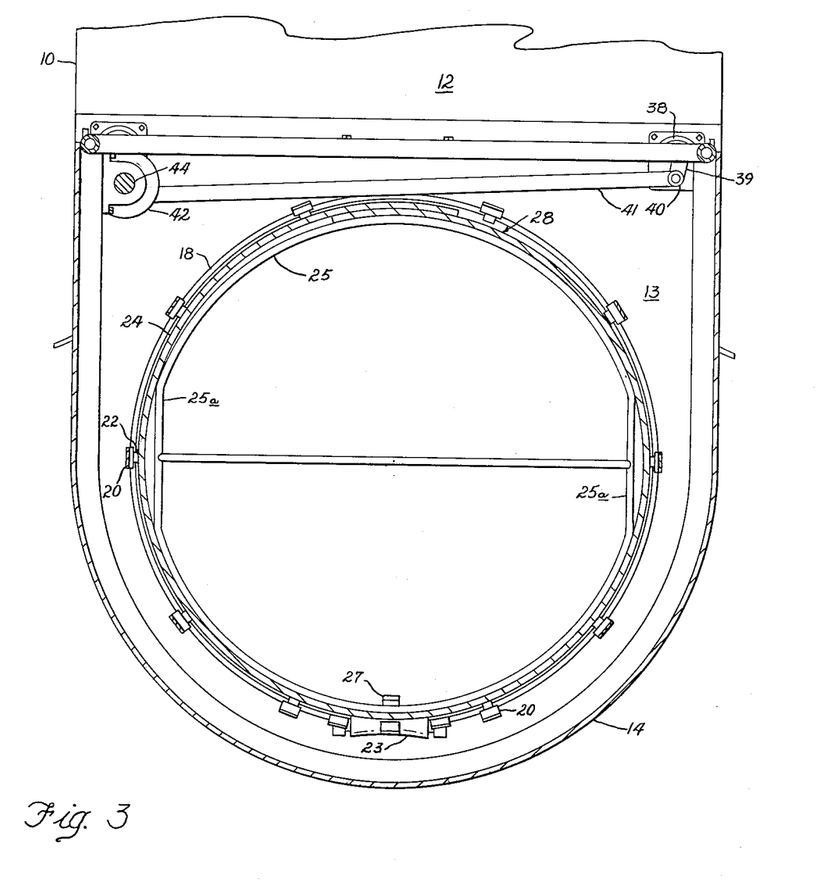
FIGURE 3 is an enlarged fragmentary sectional view taken on the line 3—3 of FIGURE 1.
Figure 4:
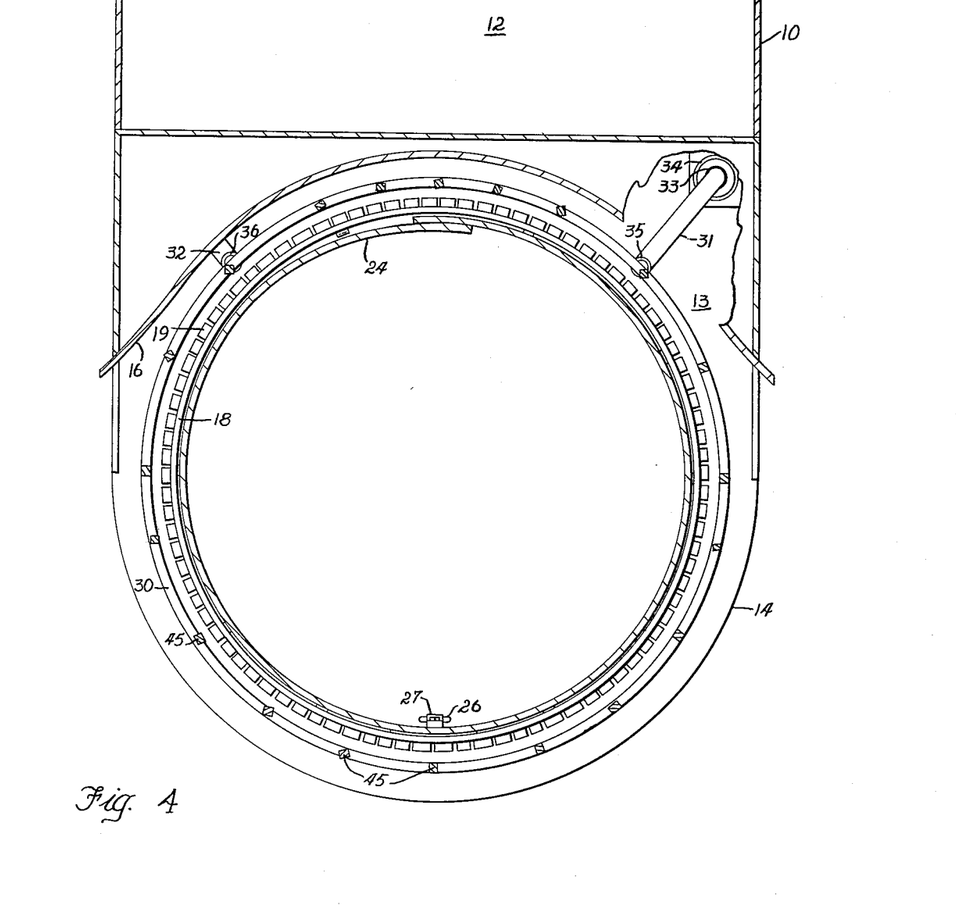
FIGURE 4 is an enlarged fragmentary sectional view taken on the line 4—4 of FIGURE 2.
Figure 5:
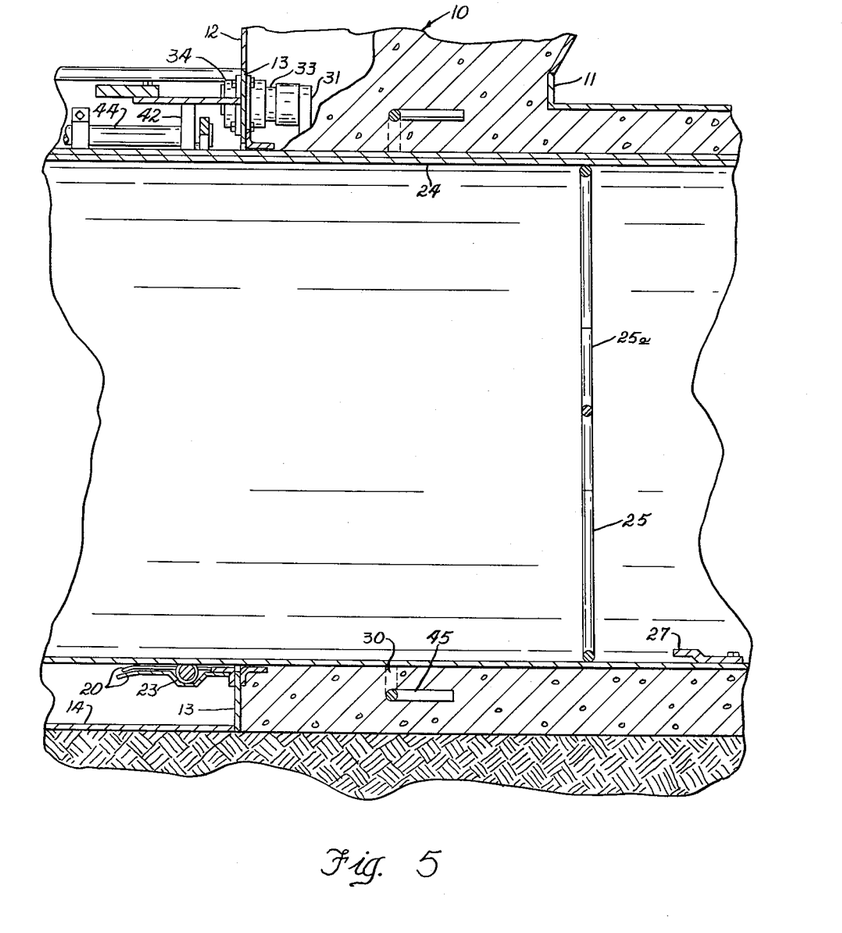
FIGURE 5 is an enlarged fragmentary sectional view taken longitudinally through the machine on the line 5—5 of FIGURE 1 with the concrete partly broken away.

The machine is designed to move along the ditch in the direction designated by the arrow in FIGURE 2 and therefore the direction to the right in FIGURE 2 shall be the forward direction and the direction to the left shall be the rearward direction.

The general machine illustrated has a vertical hopper 10 at its upper portion which includes a rear wall 11. The forward wall 12 of hopper 10 is attached to a vertical bulkhead 13 which is mounted on a front shoe portion 14. Both bulkhead 13 and front shoe portion 14 have lower contours corresponding to the ditch shape. In the embodiment shown this contour is semi-circular. This allows the shoe portion 14 to fill the ditch with the bulkhead 13 preventing forward movement of concrete fed into hopper 10.

Rearward of hopper 10 is fixed a top forming shell 15 which has a concave lower face 16 that extends horizontally. Shell 15 shapes the outer edge of the poured pipe between the walls of the ditch.

The shoe portion 14 is elongated and has an open top to receive inner forms. A motor 17 is mounted in the forward end of shoe 14 and provides power to pull the machine along the ditch and to operate the consolidator. The shoe may be hinged at its center if desired in order to facilitate the pouring of curved pipelines.

Bulkhead 13 has a large central opening in which a baffle strip 18 is welded. The baffle strip 18 is provided with an integral vertical ring 19 which is fixed to the rearward side of bulkhead 13. The inner forms are inserted through the bulkhead 13 directly adjacent to baffle strip 18 to form an effective seal between strip 18 and the inner form and thereby restrict forward movement of concrete poured into hopper 10.

Forwardly extending flat fingers 20 are rigidly attached to the outside edge of baffle strip 18. The fingers 20 are bent outwardly at 21 near their forward ends. The fingers 20 have apertures to rotatably mount wheels 22 which extend slightly beyond the inner edge of fingers 20. The three lower fingers 20 have mounted between them a concave roller 23 which carries the lower portion of the forms.

The forms used may be of any conventional shape which extends into partial or complete cross section of whatever inner shape is desired. The illustrated forms 28 are short split rings 24 made of metal such as aluminum. The forms are supported by struts 25 which are formed of tubular metal and have flat sides 25a. The struts can easily be removed by turning the strut 25 so that it extends lengthwise of the pipeline and then by twisting the strut, it may be pulled from the pipeline on side 25a. Adjacent rings 24 overlap and are connected by alternating loops 26 and hooks 27 respectively fixed to each end of rings 24. After struts 25 have been removed, the linked rings 24 can be easily pulled from the pipeline as a unit.

The specific structures of the machine and inner forms are not imperative to the practice of this invention and various equivalent devices may be substituted in their place. A detailed description of this one embodiment is necessary as an example for environmental purposes.

The consolidating mechanism which is the nucleus of the invention will now be explained. In FIGURES 1–5, a ring 30 is mounted rearwardly of the opening in bulkhead 13 and surrounds the inner forms 28. Ring 30 is supported at a spaced distance from inner form 28 and bulkhead 13 by two arms 31, 32. Arm 31 provides idler support through pivot 35 and is fixed to a perpendicular shaft 33 rotatably journalled in bulkhead 13 by bearing 34. Arm 32 is pivoted at 36 to ring 30 and is fixed to a perpendicular shaft 37 which extends through bearing 38 mounted in bulkhead 13. The forward end of shaft 37 has fixed to it a crank arm 39 which is pivoted at 40 to a long pitman 41. The pitman 41 extends transversely of the machine and is rotatably carried by an eccentric 42 fixed to a drive shaft 44. Shaft 44 may be driven directly from motor 17 or may be driven by a hydraulic motor. The resulting motion imparted to ring 30 by this mechanism is almost pure rotary oscillation, although some transverse movement must be allowed.

Ring 30 is provided with a plurality of rectangular blades or bars 45 mounted at various angles of tilt in a horizontal plane. The bars 45 are of unequal lengths and some have rearward extensions 46. The bars 45 directly surround the form 28 and act to distribute and compact the concrete as it flows from hopper 10 to its place surrounding form 28. The consolidating action also mixes the concrete and increases its flow to provide a uniform homogeneous pipeline with even distribution of aggregate. Since the entire machine is moving forward during consolidation, ring 30 also moves axially of form 28 and recedes from the concrete as it consolidates.

Figure 6:
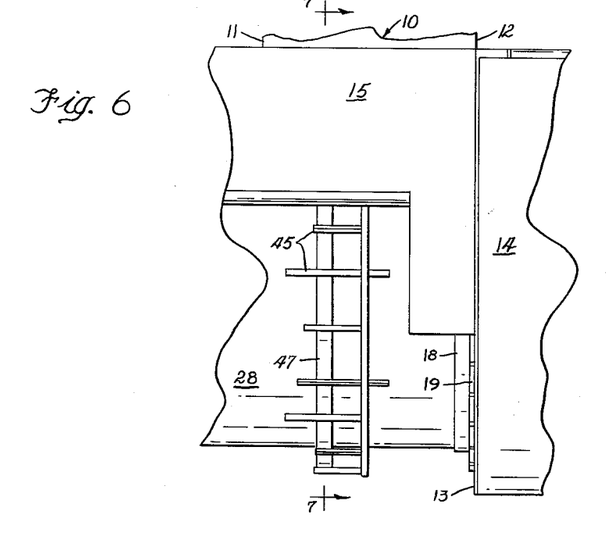
FIGURE 6 is a fragmentary side view of the machine showing a modification of the consolidating means.
Figure 7:
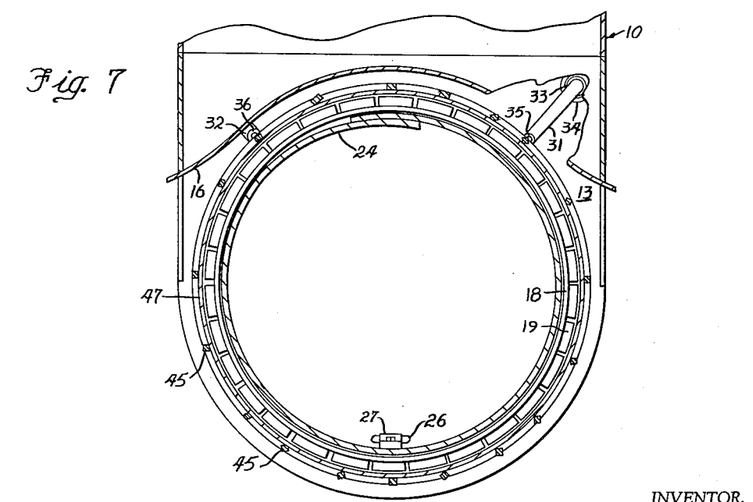
FIGURE 7 is a sectional view taken on the line 7—7 of FIGURE 6.

In the form shown in FIGURES 6 and 7, the blades or bars 45 are connected by a second rearwardly mounted ring 47. Ring 47 is thin radially of form 28, and acts to cut through the concrete between bars 45 to keep the concrete in motion.

Figure 8:
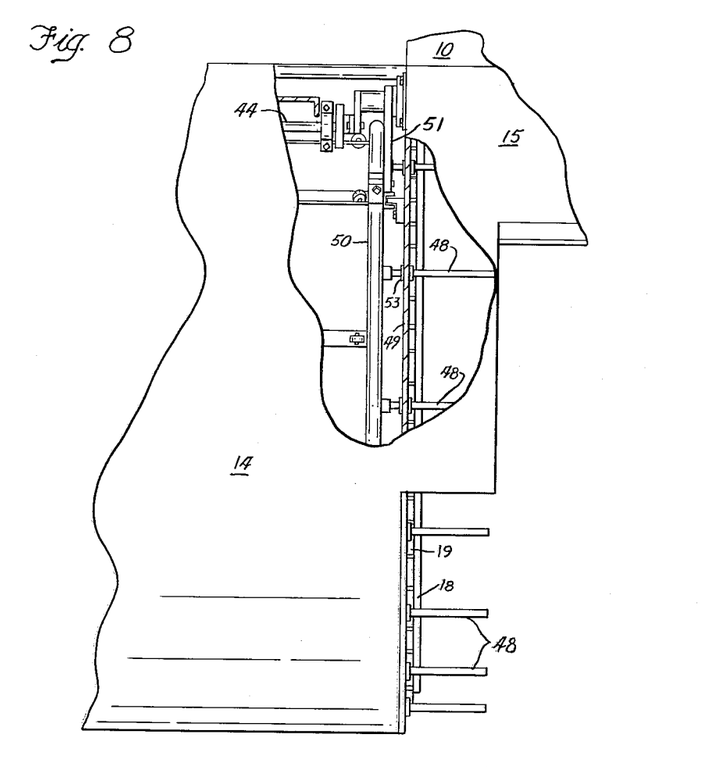
FIGURE 8 is a fragmentary side view with part of the shoe wall broken away, showing another form of consolidating means.
Figure 9:
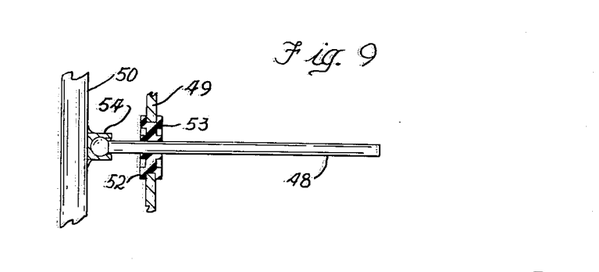
FIGURE 9 is an enlarged detail view of the mounting of the consolidating means shown in FIGURE 8.

In the form of the invention shown in FIGURES 8 and 9, the consolidating fingers 48 are mounted for oscillation in the modified bulkhead wall 49. The fingers 48 extend through the wall 49 and are connected together for oscillation by a drive ring 50 supported by two arms 51 similar to arms 31, 32 in FIGURES 1–5, but mounted forwardly of the bulkhead wall 49. One arm 51 is driven by a pitman from shaft 44 in the same manner as set forth in FIGURES 1–5 to produce an oscillating movement of ring 50.

The fingers 48 are mounted in the modified bulkhead 49 in the manner shown in detail in FIGURE 9. A rubber bushing 53 is mounted in each aperture 52 in the bulkhead 49 for a finger 48. The finger 48 is mounted in each aperture 52 so that it may oscillate and the connection between each finger 48 and ring 50 is a universal pivot joint 54. With this arrangement, the portion of each finger 48 that extends into the concrete has both vertical and horizontal movement. This movement increases in intensity toward the rearward end of each finger 48 with the result that the concrete in the machine is actually pushed rearwardly by this finger movement. In this embodiment ring 50 may be circular, oval, or even square if desired, so long as the fingers 48 are maintained in the final path of the concrete. This allows the use of this machine to pour a concrete pipeline in almost any desired cross section.

Figure 10:
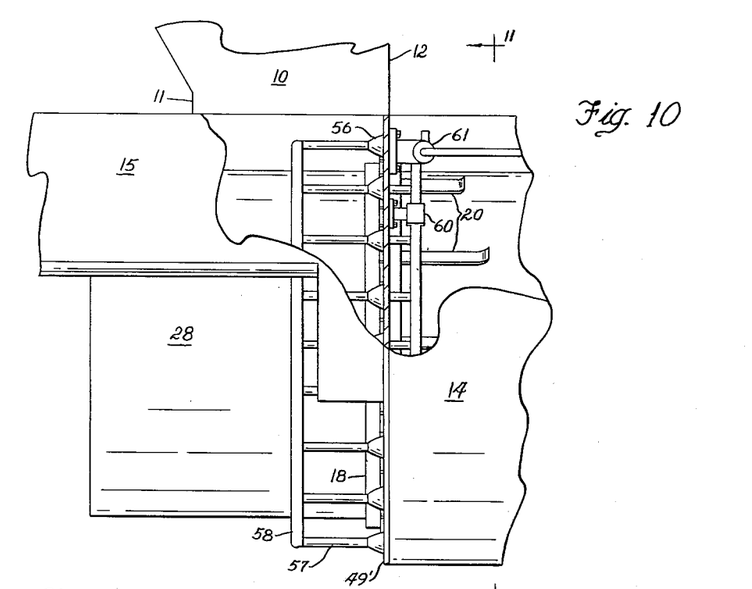
FIGURE 10 is a fragmentary view similar to FIGURE 2, with the side plates partially broken away for clarity, showing a modified construction of the consolidating means.
Figure 11:
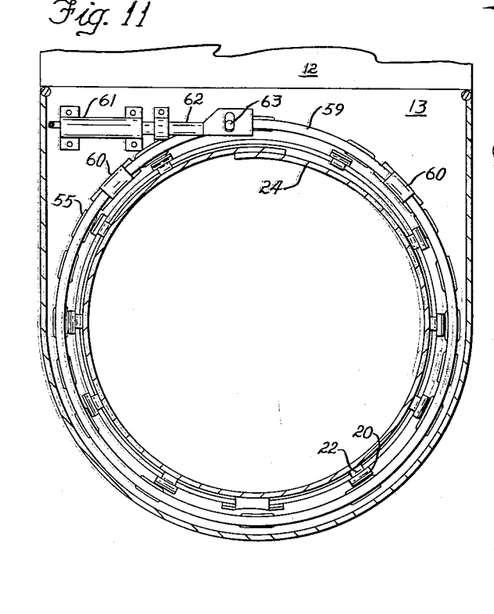
FIGURE 11 is a sectional view taken along line 11—11 in FIGURE 10.
Figure 12:
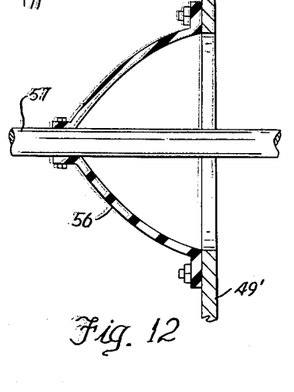
FIGURE 12 is an enlarged detail view of the mounting of the consolidating means shown in FIGURE 10.

The embodiment shown in FIGURES 10 and 11 makes use of a pure rotary oscillatory consolidating motion. The basic structure of the machine and bulkhead 49' is the same as shown in FIGURES 8 and 9 and similar numerals are used. The apertures 55 which are circumferentially located in bulkhead 49' are each somewhat larger than the apertures 52 and each contains a flexible bushing 56 which extends rearwardly in a conical shape and tightly grips fingers 57 at its center opening. Fingers 57 are joined by a ring 58 at their rearward end and by a ring 59 forward of bulkhead 49'.

Ring 59 is journalled by two fixed bearings 60 fixed to the forward wall of bulkhead 49'. These bearings permit only pure rotary motion of ring 60. A double-acting hydraulic cylinder and piston assembly 61 mounted on bulkhead 49' has its piston rod 62 pivotally joined to ring 60 at 63. Suitable controls (not shown) operate the hydraulic assembly 61 to thereby oscillate ring 60. Due to the rigid connections between rings 60 and 59 by fingers 57, this results in a pure oscillating movement of ring 59 to thereby spread and consolidate the concrete being poured around form 28. The use of pure rotary oscillating motion has the advantage of eliminating much of the rough rocking movement in the machine, which may act against forms 28 to throw the forms off their true center position.

Figure 13:
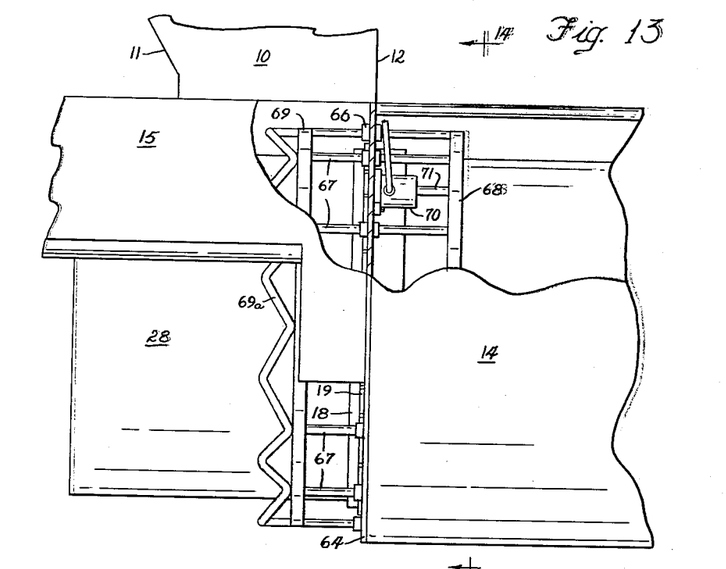
FIGURE 13 is similar to FIGURE 10 and shows a modified consolidating device.
Figure 14:
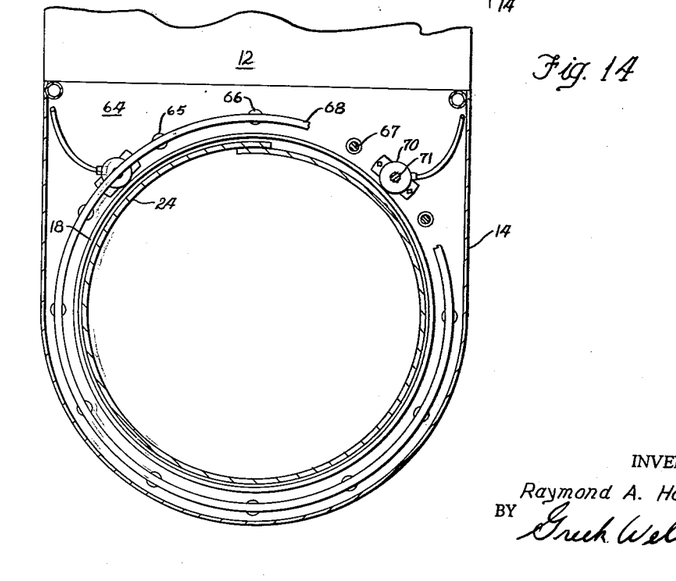
FIGURE 14 is a sectional view taken along line 14—14 in FIGURE 13.

FIGURES 13 and 14 show a further modification. In this case the modified bulkhead 64 has apertures 65 which receive bearings 66. Bearings 66 slidably mount a series of bars 67 which extend through bulkhead 64 and which are joined at their forward and rearward ends by rings 68 and 69 respectively. The forward ring 68 is reciprocated axially along the pipeline by a double acting hydraulic assembly 70 mounted upon bulkhead 64 and connected by piston rod 71 to ring 68.

Attached to ring 69 is a saw tooth configuration of angular fingers 69a formed of tubular stock. The use of angular consolidating fingers such as 69a, as an example, is particularly useful in larger assemblies. These teeth serve to distribute the concrete about the bottom half of the forms to provide a uniform density in the pipeline. It is to be understood throughout this application that the fingers and rings are illustrated as exemplary forms only, and that angular, bent or otherwise formed fingers may be used and freely substituted in order to attain the desired results.

This embodiment may be made with rings 68 and 69 formed in any desired shape and pushes the concrete axially as it consolidates due to the relative forward movement of the machine with respect to the pipeline.

Figure 15:
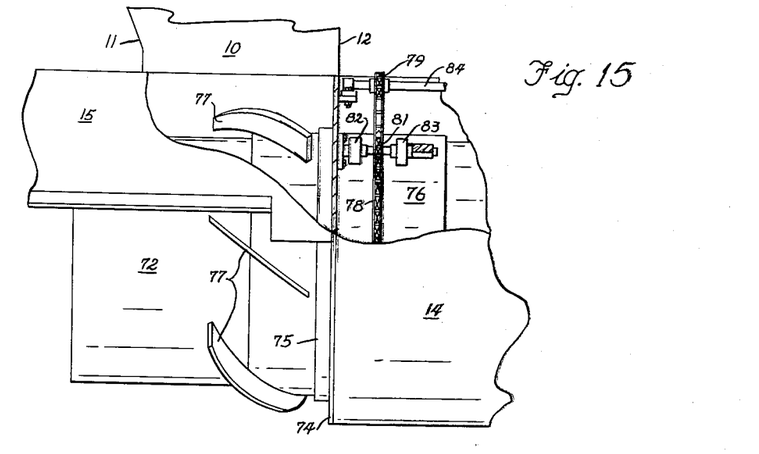
FIGURE 15 is similar to FIGURE 10 and shows a further modification in the consolidating means.
Figure 16:
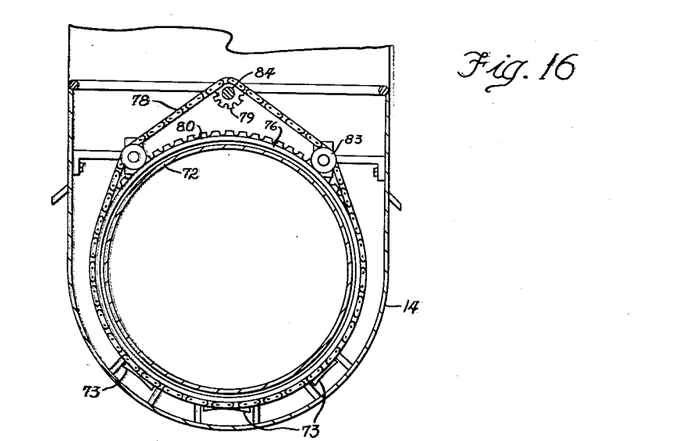
FIGURE 16 is a sectional view taken along line 16—16 in FIGURE 15.

A rotary consolidator is illustrated in FIGURES 15 and 16. This form is of particular advantage in small installations ranging from 8 to 20 inches in inner diameter. The form 72 may be a permanent plastic liner as shown or may be a collapsible temporary form of common assembly. The form 72 is positioned by a series of three concave rollers 73 rotatably carried by the shoe portion 14 of the machine.

Bulkhead 74 has a forwardly extending barrier lip 75 surrounding a central opening through which the inner form 72 is fed. Rotatably carried by this lip 75 is an axial drum 76 which extends axially beyond each wall of bulkhead 74. The rearward section of the drum 76 carries a circumferential series of curved blades 77 which act as consolidating means. The forward section of the drum 76 is rotatably carried by a chain 78 which connects a driving sprocket 79 mounted in shoe portion 14 and a sprocket portion 80 formed on the exterior of the drum 76. A pair of idler sprockets 81 aid in locating the drum 76, which is vertically positioned by two pairs of rollers 82, 83 mounted in shoe portion 14. Driving socket 79 is rotatably driven by shaft 84 which is powered by conventional methods. Drum 76 and form 72 are positioned close to each other to effectively seal off the poured concrete.

The inclination of blades 77 is such that rotation of drum 76 as the machine moves forwardly tends to push the concrete rearwardly and toward the form 72 to compact the concrete around the inner form.

In each of these modifications, consolidation is obtained by moving the poured concrete in its final position, utilizing an oscillating, rotary, or reciprocating motion, or a combination of such motions. This causes the concrete to fill the space surrounding the inner form and compacts the concrete to a density whereby it is able to maintain its shape after the machine has passed. It further allows the use of concrete having virtually no slump characteristic to provide smooth, strong pipelines with no joint problems and walls whose density and dimensions are uniform throughout their length.

It is to be understood that the embodiments of this invention specifically described are by no means exhaustive. Various modifications are possible within the skill of one trained in this art without deviating from the scope of this invention. Therefore only the definitions of the claims are intended to limit this invention.

Having thus described my invention, I claim:

1. In an apparatus for producing pipe from cementitious material that solidifies upon standing in a trench having a bottom wall and side walls formed to directly receive the cementitious material, which apparatus comprises a shoe member having a bottom portion adapted to travel along the trench bottom and side walls, a hopper coupled to the shoe member to move therewith having a front bulkhead wall provided with an opening through which inner conduit form means may be extended from said shoe, inner form means, and a top conduit shaping outer form affixed to the hopper, the improvement comprising a circumferential material consolidating ring having a consolidating means thereon spaced radially about the inner form means rearwardly of the bulkhead wall and movably supported by the bulkhead wall, oscillating drive means in said shoe operatively connected to said consolidating ring, said oscillating drive means being operable to oscillate the consolidating ring within the space around the inner form between it and the trench surfaces and between the inner form and the top outer form.

2. In an apparatus for producing pipe from cementitious material that solidifies upon standing in a trench having a bottom wall and side walls formed to directly receive the cementitious material, which apparatus comprises a shoe member having a bottom portion adapted to travel along the trench bottom and side walls, a hopper coupled to the shoe member to move therewith having a front bulkhead wall provided with an opening through which inner conduit form means may be extended from said shoe, inner form means, and a top conduit shaping outer form affixed to the hopper, the improvement comprising a material consolidating means embodying a circumferential ring having a plurality of fingers spaced radially outward from the inner form means rearwardly of the bulkhead wall and movably supported by the bulkhead wall, drive means in said shoe coupled to said consolidating means, operable to oscillate the fingers within the space around the inner form between it and the trench surfaces and the inner form and the top outer form, the fingers extending lengthwise of the apparatus rearwardly of the bulkhead.

3. In an apparatus for producing pipe from cementitious material that solidifies upon standing in a trench having a bottom wall and side walls formed to directly receive the cementitious material, which apparatus comprises a shoe member having a bottom portion adapted to travel along the trench bottom and side walls, a hopper coupled to the shoe member to move therewith having a front bulkhead wall provided with an opening through which inner conduit form means may be extended from said shoe, inner form means, and a top conduit shaping outer form affixed to the hopper, the improvement comprising a material consolidating means embodying a circumferential ring having a plurality of fingers spaced radially outward from the inner form means rearwardly of the bulkhead wall and movably supported by the bulkhead wall, drive means in said shoe coupled to said consolidating means, operable to oscillate the fingers transversely of the direction of movement of the machine within the space around the inner form between it and the trench surfaces and between the inner form and top outer form, the fingers extending lengthwise of the apparatus rearwardly of the bulkhead.

4. In an apparatus for producing pipe from cementitious material that solidifies upon standing in a trench having a bottom wall and side walls formed to directly receive the cementitious material, which apparatus comprises a shoe member having a bottom portion adapted to travel along the trench bottom and side walls, a hopper coupled to the shoe member to move therewith having a front bulkhead wall provided with an opening through which inner conduit form means may be extended from said shoe, inner form means, and a top conduit shaping outer form affixed to the hopper, the improvement comprising a plurality of circumferential apertures in the bulkhead wall spaced radially outward from the opening therein, sealing means mounted in said apertures, a plurality of fingers, each of said fingers being mounted by said sealing means in a separate one of said apertures, said fingers extending both forwardly and rearwardly beyond the bulkhead wall, a ring pivotally joined to the forward ends of the fingers and drive means operable to oscillate the ring.

5. In an apparatus for producing pipe from cementitious material that solidifies upon standing in a trench having a bottom wall and side walls formed to directly receive the cementitious material, which apparatus comprises a shoe member having a bottom portion adapted to travel along the trench bottom and side walls, a hopper coupled to the shoe member to move therewith having a front bulkhead wall provided with an opening through which inner conduit form means may be extended from said shoe, inner form means, and a top conduit shaping outer form affixed to the hopper, the improvement comprising a plurality of circumferential apertures in the bulkhead wall spaced radially outward from the opening therein, flexible sealing means mounted in said apertures, a plurality of fingers, each of said fingers being mounted by said flexible sealing means in a separate one of said apertures, said fingers extending both forwardly and rearwardly beyond the bulkhead wall, a first ring fixed to the forward ends of the fingers, a second ring fixed to the rearward ends of the fingers, said fingers, first and second rings forming a consolidating assembly, means mounted on the bulkhead wall to limit movement of the consolidating assembly to rotary movement and drive means operatively connected to said consolidating assembly adapted to impart an alternating rotary motion thereto.

6. In an apparatus for producing pipe from cementitious material that solidifies upon standing in a trench having a bottom wall and side walls formed to directly receive the cementitious material, which apparatus comprises a shoe member having a bottom portion adapted to travel along the trench bottom and side walls, a hopper coupled to the shoe member to move therewith having a front bulkhead wall provided with an opening through which inner conduit form means may be extended from said shoe, inner form means, and a top conduit shaping outer form affixed to the hopper, the improvement comprising a plurality of circumferential apertures in the bulkhead wall spaced radially outward from the opening therein, a plurality of fingers, each of said fingers being slidably mounted in a separate one of said apertures, said fingers extending both forwardly and rearwardly beyond the bulkhead wall, connecting means rigidly fixed to the forward ends of the fingers to thereby form a rigid consolidating assembly, and drive means operatively coupled with the consolidating assembly adapted to reciprocate the fingers within the apertures.

7. The device as defined in claim 6 wherein the rearward ends of the fingers are rigidly fixed to peripheral means adapted to compact the cementitious material responsive to the reciprocation of the fingers.

8. In an apparatus for producing pipe from cementitious material that solidifies upon standing in a trench having a bottom wall and side walls formed to directly receive the cementitious material, which apparatus comprises a shoe member having a bottom portion adapted to travel along the trench bottom and side walls, a hopper coupled to the shoe member to move therewith having a front bulkhead wall provided with an opening through which inner conduit form means may be extended from said shoe, inner form means, and a top conduit shaping outer form affixed to the hopper, the improvement comprising a plurality of circumferential apertures in the bulkhead wall spaced radially outward from the opening therein, sealing means mounted in said apertures, a plurality of fingers, each of said fingers being mounted by said sealing means in a separate one of said apertures, said fingers extending both forwardly and rearwardly beyond the bulkhead wall, drive means operatively connected to the forward ends of the fingers operable to oscillate the ring.

References Cited in the file of this patent
UNITED STATES PATENTS

| | | |
|---|---|---|
| 291,849 | Howson | Jan. 8, 1884 |
| 2,053,307 | Wilson | Sept. 8, 1936 |
| 2,236,757 | Lines | Apr. 1, 1941 |
| 2,406,025 | Moor | Aug. 20, 1946 |
| 2,713,709 | Wright | July 26, 1955 |
| 2,731,698 | Tunsen | Jan. 24, 1956 |
| 2,842,827 | Nickelson | July 15, 1958 |